Figure 1:
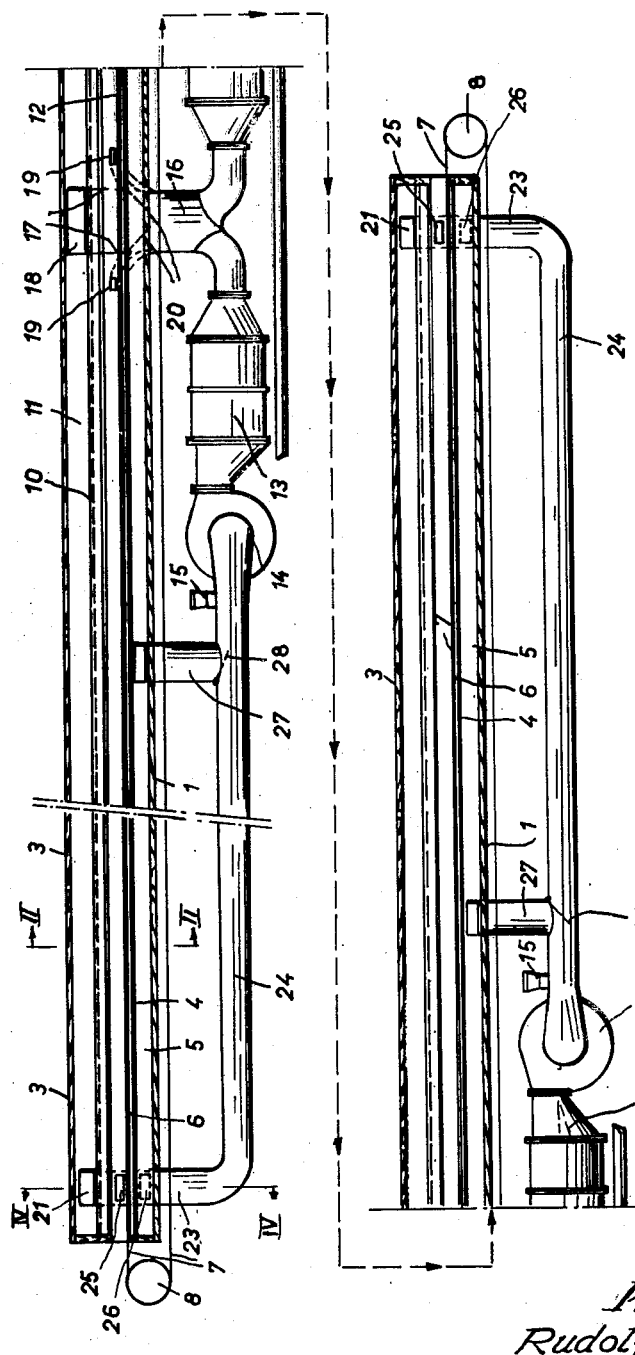

Sept. 29, 1964   R. RATHS ETAL   3,150,504
COOLING APPARATUS
Filed April 17, 1962   2 Sheets-Sheet 1

Inventors:
Rudolf Raths
Jürg Kleinert
By Sorro, Anderson, Luckela & Peter Attys

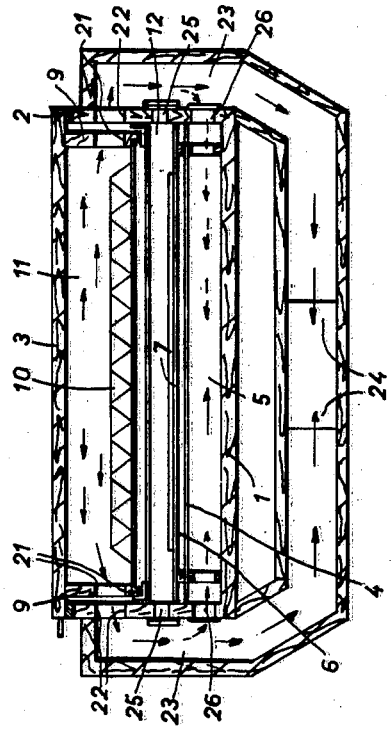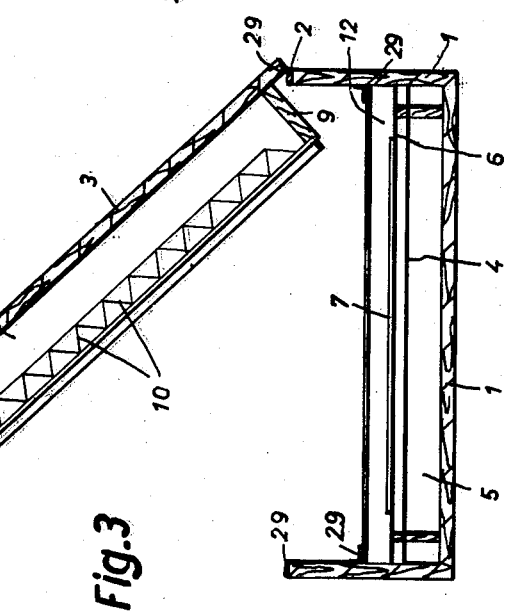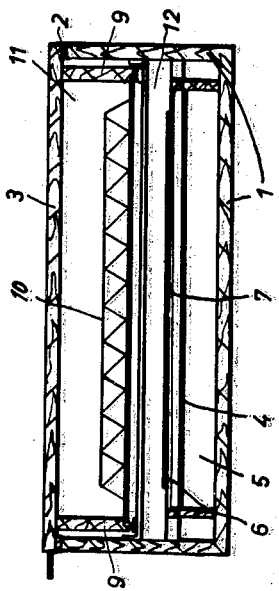

3,150,504
COOLING APPARATUS
Rudolf Raths, Kilchberg, Zurich, and Jürg Kleinert, Zurich, Switzerland, assignors to Chocoladefabriken Lindt & Sprüngli Aktiengesellschaft, Zurich, Switzerland
Filed Apr. 17, 1962, Ser. No. 188,064
Claims priority, application Switzerland Sept. 23, 1961
6 Claims. (Cl. 62—380)

The present invention relates to cooling apparatus which is particularly adapted for cooling crystalline masses of fused fat and fused chocolate and also articles of the chocolate and sweets industry, which are covered with chocolate coatings and fatty icings.

According to the principle of energy absorption, heat is continuously withdrawn from the goods to be chilled and the goods are thus cooled either in stationary position or while travelling through a channel system, the goods being placed upon a suitable radiation-permeable conveyer means.

Cooling apparatus are already known, in which the heat rays emanating from the goods to be cooled are reflected by means of glossy surfaces onto dull black, energy-absorbing cooling pipe systems. Such cooling apparatus is characterised on the one hand by comparatively large cross-sections and on the other hand by complicated construction. Moreover, since unconditioned air can penetrate into such cooling apparatus, formation of condensate occurs on the cool heat-absorbing elements and will cause ice to be formed on the dull black absorption systems when working at temperatures of below 0° C., whereby the efficiency of such apparatus will be impaired owing to the reflection of heat rays.

It is an object of the present invention to provide apparatus for cooling goods of the above specified kind, which eliminates the mentioned drawbacks.

According to the invention, cooling apparatus for cooling crystalline fused fatty masses, tempered chocolate masses, fatty icings, and small coated articles of the candy industry comprises means for withdrawing energy from the goods arranged on conveyer means in a cooling channel during passage therethrough, without mechanically produced air circulation in said channel, by heat absorption owing to the provision of dull black surfaces, heat being withdrawn at the rear side thereof by a secondary channel system in which a conditioned gaseous cooling medium circulates.

Preferably, the primary cooling channel of the apparatus may be covered entirely or partly with dull black heat absorption sheets, and the energy withdrawn from the goods to be cooled by the absorption surface is carried away on the back of this surface by a conditioned gaseous cooling medium which acts to simultaneously produce a slight overpressure in the primary cooling channel and thus excludes any inward penetration of unconditioned air from the outside. The structurally very simple absorption cooling apparatus operates according to the satisfactory and utmost economical closed cycle principle, in which the gaseous cooling medium is automatically de-humidified while circulating during the cooling operation. The dull black absorption surfaces themselves thus can be horizontally arranged above the goods to be cooled and spaced a minimum distance from the latter, since a moistening or wetting effect owing to the formation of condensate is not to be feared; therefore the apparatus according to the invention results into small sectional areas, which fact facilitates the protection against penetration of unconditioned moist outside air into the primary cooling channel, in addition with a slight overpressure of the circulating cooling air.

The present invention will now be described in more detail with reference to the accompanying drawings illustrating, by way of example, the construction and the manner of operation of the absorption cooling apparatus according to the invention. In the drawings:

FIGURE 1 diagrammatically shows in elevation and partly in longitudinal section a cooling apparatus according to the invention, FIGURE 2 is a cross-section through the apparatus on the line II—II of FIGURE 1, drawn to a larger scale, FIGURE 3 is the same cross-section as shown in FIGURE 2, but with the top portion open, and FIGURE 4 shows sections through the end zone of the apparatus on the line IV—IV of FIGURE 1.

The diagrammatically represented cooling apparatus primarily has been developed for cooling crystalline molten masses of fat and chocolate, oversaturated crystalline sugar solutions, and also small articles coated with chocolate layers and fatty icings, and the like.

The cooling channel may be built up to any desired length according to the box building principle from sections, provided with top portions 3 adapted to tilt upwardly, said segments being made of wood or other suitable structural material affording an insulating effect.

Above a conveyer belt 7 and below a radiation pervious sliding path 6 therefor, nonreflective dull black absorption plates 10 and 4, respectively, are arranged, which on their back side are contacted by the gaseous cooling medium circulating through the secondary channels 11 and 5.

The goods to be cooled are placed upon the endless conveyer belt 7 which continuously travels through the absorption cooling channel 12 in the desired direction, e.g., from the left to the right hand, said belt 7 sliding along the radiation pervious path 6 and passing around the driving pulleys 8 at the ends of the channel.

In the top portions 3 which are fixed to the casing sections 1 by hinges 2, dull black absorption plates 10 are arranged between the lateral walls 9 of the secondary cooling channel 11; the plates 10 are of zigzag shape in order to increase the effective surface. The upper secondary cooling channel 11 in which the gaseous cooling medium circulates, thus is formed by the insulating ceiling plate 3 as well as the insulating lateral parts 9 and the absorption plates 10.

When the top sections are closed an absorption cooling channel 12 is formed which is defined at the top by the dull black absorption plates 10 of zigzag shape, at the sides by the insulating outer walls of the casing 1, and by the sliding path 6 along which the conveyer belt 7 travels. During its movement through the channel 12, the goods to be cooled are subjected to a withdrawal of heat at their surfaces, mainly by absorption and in addition by the unavoidable air convection caused by thermosiphon action. Furthermore, some heat transfer results by conduction between the supporting surfaces of the goods and the conveyer belt 7.

As illustrated in FIGURE 3, the entire absorption cooling channel 12 in each section is readily accessible, since the top portions of the individual sections can be turned upwardly. Foam rubber gaskets 29 are sealing the channel system 11 towards the outside and also towards the primary cooling channel 12.

Cooling and de-humidifying units 13 which may be arranged singly or in pairs so as to face each other, are mounted in the middle underneath the cooling channel as shown in FIGURE 1 of the drawings. Ventilators 14 feed the gaseous cooling medium through the cooling and dehumidifying units 13 and deliver it to the common pressure conduit 16. When air is employed as cooling medium, this air may be drawn-in through filters 15 which are provided with regulating flaps, in order to compensate the small losses resulting from operating with a slight overpressure in the primary cooling channel 12. The conditioned cooling medium is introduced by the branch conduits 17 through the lateral inlet openings 18 into the top secondary cooling channel 11. Furthermore, two secondary nozzles 19 branch off from the pressure conduit 16; said nozzles are provided with regulating flaps 20 and open into an absorption cooling channel 12, in order to be able to produce a slight over-pressure in said channel, if required, by blowing-in the conditioned cooling medium.

From the centre of the secondary cooling channel 11 the conditioned cooling medium flows over the top side of the zigzag-shaped dull black absorption plates 10 towards both ends of the channel where it enters through the lateral openings 21 and 22 into the lateral branch conduits 23, as illustrated in FIGURE 4. From the branch conduits 23 the gaseous cooling medium, when required, can be blown through flap valves 25 into the absorption cooling channel 12, in order to produce a barrier against the penetration of unconditioned ambient air. The main stream of the cooling medium passes through the return conduits 24, as well as through the adjustable flap valves 26 into the secondary bottom cooling channels 5, and through the connecting tubes 27, provided with regulating flaps 28, into the return conduits 24 from where the cooling medium is drawn by the ventilators 14 into the conditioning units 13 and delivered again in a circulating process into the cooling channels.

It is evident from FIGURE 1 that the gaseous cooling medium, on its way from the centre of the cooling channel 11 towards the channel ends takes up the energy transferred from the goods to be cooled to the absorption surfaces 10, and accordingly causes a temperature rise in the absorption cooling channel 12.

The fact that the cooling action is most intensified in the central portion and slightly declines towards the ends of the channel, automatically creates a multiple zone cooling action with continuous transitions in the absorption cooling channel 12.

When ambient air is drawn-in through the filters 15 such air can never arrive in the primary and secondary cooling channel arrangement in an unconditioned state, since it automatically must pass through the cooling and de-humidifying units 13. Furthermore, since an overpressure can be produced in the absorption cooling channel 12 by blowing-in the conditioned gaseous cooling medium through the adjustable nozzles 19 and a barrier veil can be formed at the channel ends by opening the flap valves 25, any penetration of unconditioned outside air and thus any humidifying and icing effects on the dull black absorption plates 10 which may lead to a drop in energy owing to reflection phenomena is rendered impossible.

When it is necessary, for example in localities in which the air has a high degree of moisture content, the air conditioning units 13 can be designed and operated so that the air is considerably cooled in a first stage of operation for the purpose of obtaining an extreme de-humidification effect, and in a second stage the air is brought to the optimum operating temperature.

In order to obtain a beautiful brilliancy on the coated bottom surfaces of the articles covered with chocolate coatings or fatty frostings, the conveyer belt 7 can be suitably conditioned, i.e., preheated or cooled at the desired point of the apparatus, not indicated in the drawings, prior to its entry into the absorption cooling channel 12 by means of an appropriately mounted conditioning source, e.g., by infrared radiation, by a blower of air or the like.

We claim:

1. An absorption cooling apparatus for cooling articles of the candy industry, comprising a primary cooling channel system made of a plurality of sections, an endless conveyor belt for the articles to be cooled moving along said cooling channel, a secondary channel system disposed above the primary system and also composed of a plurality of sections, the sections of the secondary channel system being hingedly connected to the sections of said primary cooling channel system so as to be upwardly tiltable, the bottom face of the sections of the secondary channel system including heat absorption metal surfaces of high thermal conductivity for separating the primary cooling channel system from the secondary channel system when the sections of the secondary system are closed upon the primary channel system, said surfaces absorbing heat from the articles to be cooled and carried on said conveyor belt, and a cooling and de-humidifying unit provided with means for causing a stream of gaseous cooling medium to flow through said secondary channel system for withdrawing heat from said heat absorption surfaces between the cooling channel system and the secondary channel system.

2. An absorption cooling apparatus for cooling articles of the candy industry comprising an elongated primary cooling channel open at opposite ends defined by at least one horizontally positioned radiation absorbing plate, an endless radiation-pervious belt disposed within said channel below said plate and adapted to transport the articles to be cooled through said cooling channel, a secondary cooling channel system having one surface thereof defined by said absorbing plate, a cooling and dehumidifying unit adapted to provide a conditioned gaseous cooling medium, a flow distribution duct adapted to direct the gaseous cooling medium from said conditioning unit to said secondary cooling channel so as to cause the cooling medium to flow longitudinally across the upper surface of said radiation absorbing plate to withdraw the heat absorbed by said plate, said duct further being adapted to direct at least a portion of said cooling medium into said primary cooling channel to pressurize said channel to prevent entry therein of unconditioned ambient air, and a return duct adapted to conduct the gaseous cooling medium from said secondary flow channel back to said conditioning unit.

3. An absorption cooling apparatus for cooling articles of the candy industry, comprising a primary cooling channel system made of a plurality of sections, an endless conveyor belt for the articles to be cooled moving along said cooling channel, a secondary channel system disposed above the primary system and also composed of a plurality of sections, the sections of the secondary channel system being hingedly connected to the sections of said primary cooling channel system so as to be upwardly tiltable, the bottom face of the sections of the secondary channel system including heat absorption metal surfaces of high thermal conductivity for separating the primary cooling channel system from the secondary channel system when the sections of the secondary system are closed upon the primary channel system, said surfaces absorbing heat from the articles to be cooled and carried on said conveyor belt, at least one cooling and dehumidifying unit adapted to provide a conditioned gaseous cooling medium to withdraw the heat absorbed by said bottom face sections of said secondary channel system, a flow distribution duct adapted to direct the gaseous cooling medium from said conditioning unit to said secondary cooling channel so as to cause the cooling medium to flow longitudinally across the upper surface of said bottom face sections, said duct further being adapted to direct at least a portion of said cooling medium into said primary cooling channel to pressurize said channel to prevent entry therein of unconditioned ambient air, and a return duct adapted to conduct the gaseous cooling medium from said secondary flow channel back to said conditioning unit.

4. An absorption cooling apparatus for cooling articles of the candy industry comprising an elongated primary cooling channel open at opposite ends defined by a pair of horizontally spaced parallel radiation absorbing plates, an endless radiation-pervious belt disposed between said plates adapted to transport the articles to be cooled through said channel, an upper secondary cooling channel system having one surface thereof defined by the upper one of said spaced parallel plates, a lower secondary cooling channel system having one surface thereof defined by the other one of said plates, a cooling and dehumidifying unit adapted to provide a conditioned gaseous cooling medium to withdraw the heat absorbed by said plates, a flow distribution duct adapted to direct the gaseous cooling medium from said conditioning unit to the central portion of said upper secondary cooling channel so as to cause the cooling medium to flow longitudinally across the upper surface of the upper radiation absorbing plate from the center portion thereof toward each end thereof whereby to provide zones of varying degrees of cooling for the articles, a return duct adapted to conduct the gaseous cooling medium from each end of said upper secondary flow channel back to said conditioning unit, said return duct being adapted to direct at least a portion of said gaseous cooling medium into said lower secondary cooling channel at each end thereof so as to cause said medium to flow across the lower surface of said lower radiation absorbing plate from each end thereof longitudinally toward the central portion thereof to further provide zones of varied degrees of cooling for the articles.

5. An absorption cooling apparatus for cooling articles of the candy industry comprising an elongated primary cooling channel open at opposite ends defined by a pair of horizontally spaced parallel radiation absorbing plates, an endless radiation-pervious belt disposed between said plates adapted to transport the articles to be cooled through said channel, an upper secondary cooling channel system having one surface thereof defined by the upper one of said spaced parallel plates, a lower secondary cooling channel system having one surface thereof defined by the other one of said plates, a cooling and dehumidifying unit adapted to provide a conditioned gaseous cooling medium to withdraw the heat absorbed by said plates, a flow distribution duct adapted to direct the gaseous cooling medium from said conditioning unit to the central portion of said upper secondary cooling channel so as to cause the cooling medium to flow longitudinally across the upper surface of the upper radiation absorbing plate from the center portion thereof toward each end thereof whereby to provide zones of varying degrees of cooling for the articles, said duct further being adapted to direct at least a portion of said cooling medium into said primary cooling channel to pressurize said channel to prevent entry therein of unconditioned ambient air, a return duct adapted to conduct the gaseous cooling medium from each end of said upper secondary flow channel back to said conditioning unit, said return duct being adapted to direct at least a portion of said gaseous cooling medium into said lower secondary cooling channel at each end thereof so as to cause said medium to flow across the lower surface of said lower radiation absorbing plate from each end thereof longitudinally toward the central portion thereof to further provide zones of varied degrees of cooling for the articles.

6. An absorption cooling apparatus for cooling articles of the candy industry comprising an elongated primary cooling channel open at opposite ends defined by a pair of horizontally spaced parallel radiation absorbing plates, an endless radiation-pervious belt disposed between said plates adapted to transport the articles to be cooled through said channel, an upper secondary cooling channel system having one surface thereof defined by the upper one of said spaced parallel plates, a lower secondary cooling channel system having one surface thereof defined by the other one of said plates, a dehumidifying unit adapted to provide a conditioned gaseous cooling medium to withdraw the heat absorbed by said plates, a flow distribution duct adapted to direct the gaseous cooling medium from said conditioning unit to the central portion of said upper secondary cooling channel so as to cause the cooling medium to flow longitudinally across the upper surface of the upper radiation absorbing plate from the center portion thereof toward each end thereof whereby to provide zones of varying degrees of cooling for the articles, said duct further being adapted to direct at least a portion of said gaseous cooling medium into said primary cooling channel at the center thereof so as to pressurize said channel to prevent entry therein of unconditioned ambient air, a return duct adapted to conduct the gaseous cooling medium from each end of said upper secondary flow channel back to said conditioning unit, said return duct being adapted to direct at least a portion of said gaseous cooling medium into said lower secondary cooling channel at each end thereof so as to cause said medium to flow across the lower surface of said lower radiation absorbing plate from each end thereof longitudinally toward the central portion thereof to further provide zones of varied degrees of cooling for the articles, said duct further being adapted to direct at least a portion of said gaseous cooling medium into said primary cooling channel transversely across each end thereof to prevent entry therein of unconditioned ambient air.

References Cited in the file of this patent

UNITED STATES PATENTS

| 2,282,899 | Snader | May 12, 1942 |
| --- | --- | --- |
| 2,425,714 | Baer | Aug. 19, 1947 |
| 2,651,503 | Mills | Sept. 8, 1953 |
| 2,783,618 | Mills | Mar. 5, 1957 |
| 2,966,780 | Mills | Jan. 3, 1961 |
| 3,001,382 | Mills | Sept. 26, 1961 |